Oct. 9, 1945.   W. H. STATLER ET AL   2,386,577
CAR TRUCK
Filed May 12, 1943   2 Sheets-Sheet 1

Inventors
Walter H. Statler
and Louis G. Miller
By R. S. C. Dougherty
Attorney

Oct. 9, 1945. W. H. STATLER ET AL 2,386,577
CAR TRUCK
Filed May 12, 1943 2 Sheets-Sheet 2
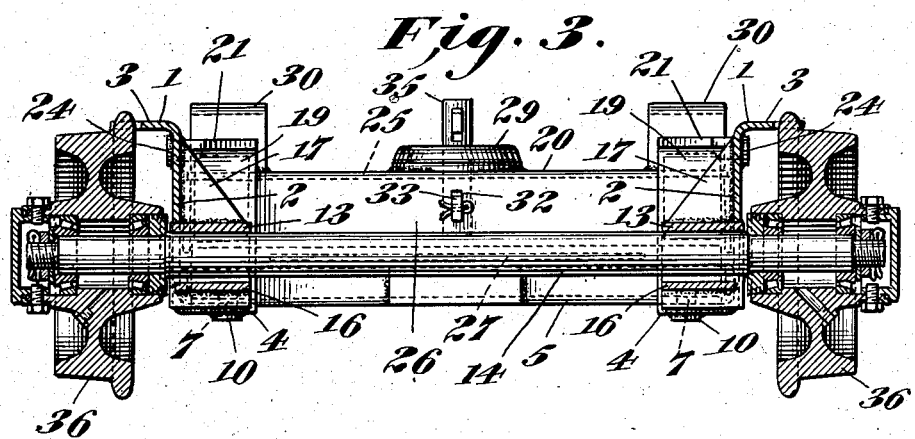
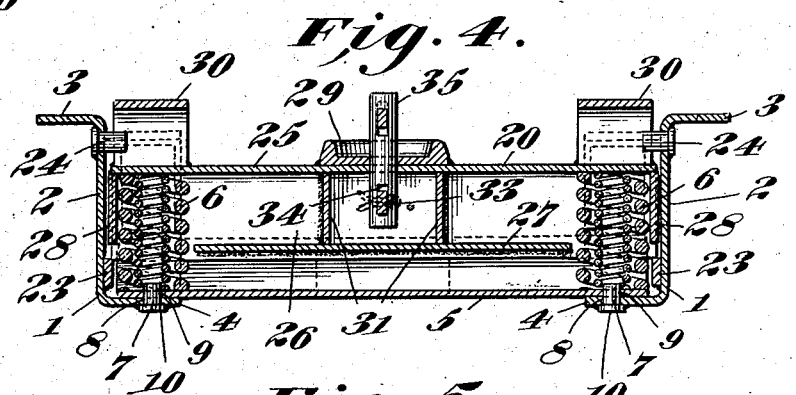
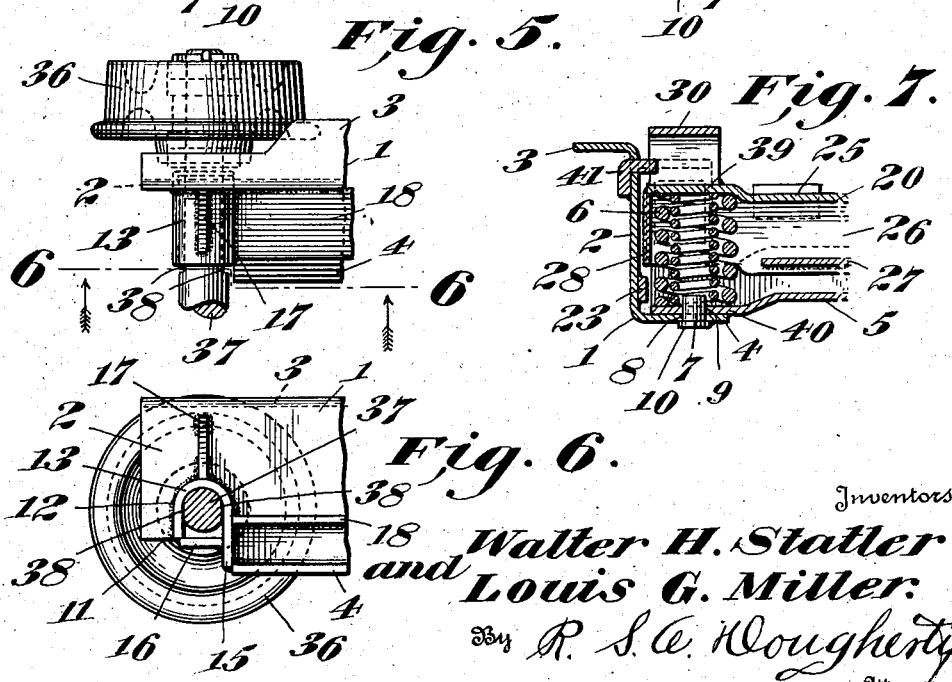
Inventors
Walter H. Statler
and Louis G. Miller
By R. S. C. Dougherty
Attorney Patented Oct. 9, 1945

2,386,577

UNITED STATES PATENT OFFICE 2,386,577

CAR TRUCK

Walter H. Statler and Louis G. Miller, Bethlehem, Pa., assignors to Bethlehem Steel Company, a corporation of Pennsylvania Application May 12, 1943, Serial No. 486,627

16 Claims. (Cl. 105—197)

This invention relates to railway car trucks and more particularly to trucks adapted for use in mines or industrial plants and has for its object to provide a truck of simple, rugged and relatively inexpensive construction.

One of the objects of our invention relates to the manner of constructing truck side frames of plate metal members which can be quickly formed in the required shapes and then welded together so as to produce a rigid structure.

Another object of the invention is to utilize the truck axles not only for mounting the supporting wheels, but also as frame members for connecting the ends of the side frames together, and at the same time to permit the desired flexibility required for uneven tracks.

Another object of the invention relates to the construction of the bolster and spring plank and assembling the same in the side frame.

Another object of the invention relates to the manner of securing the ends of the bolster and spring plank to the side frames.

With the foregoing and other objects in view, the invention will be more fully described hereinafter, and will be more particularly pointed out in the claims appended.

Having thus given a general description of the objects of our invention, we will now in order to make the same more clear, refer to the accompanying two sheets of drawings forming a part of this specification and in which like characters of reference indicate like parts.

Fig. 3 is a vertical transverse section taken on the line 3—3 of Fig. 1.

Fig. 4 is a vertical transverse section of the truck frame taken on the line 4—4 of Fig. 1.

Fig. 5 is a fragmentary detail view showing a modified form of axle.

Fig. 6 is a detail section taken on the line 6—6 of Fig. 5, and

Fig. 7 is a detail view of a modification showing one end portion of a bolster and spring plank and the adjacent portion of one of the side frames adjacent thereto in section.

Figure 1:
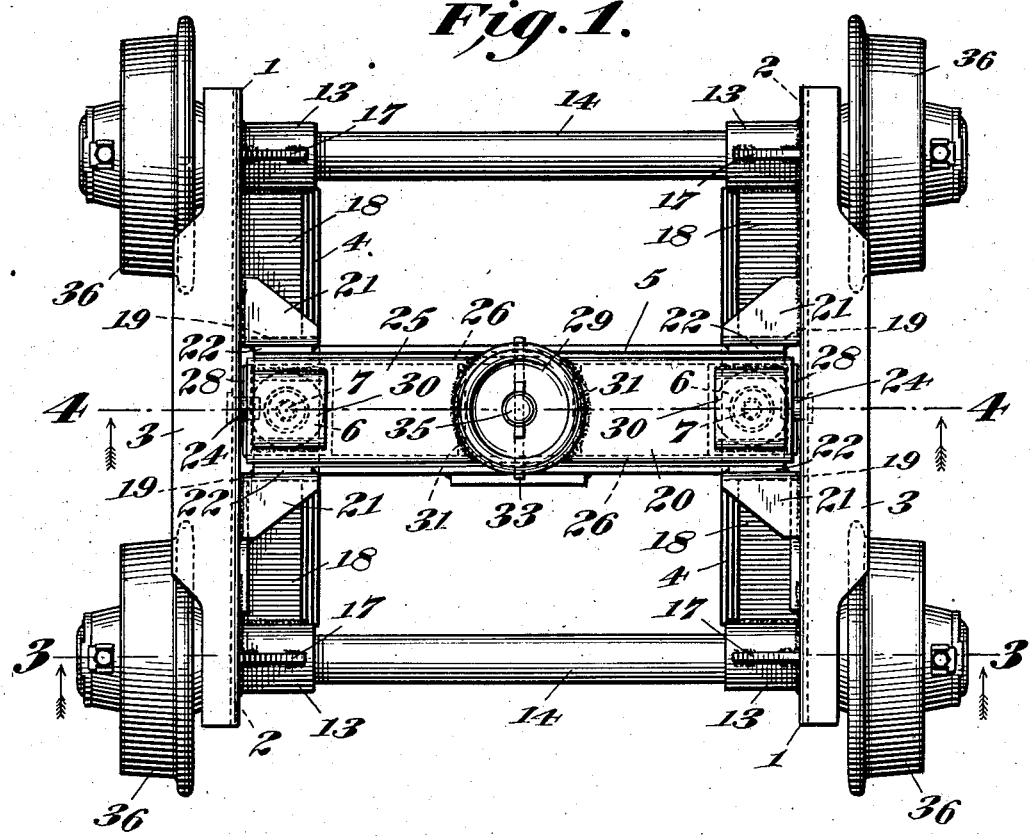
Figure 1 is a top plan view of a four wheel truck embodying our invention.

Our invention is particularly adapted for use with small freight cars of ten tons capacity more or less which may be used in mines or mills where a light weight truck is used adjacent each of the ends of the car.

Referring to the accompanying drawings and first to Figs. 1 to 4 inclusive, the two side frames, which are of similar construction, are formed of rolled plate sections cut in the desired shape and welded together. Each consists of a pressed Z-shaped side frame member 1 of considerable depth having a vertical web 2 with the top flange 3 extending outwardly and the bottom flange 4 inwardly and parallel with the top flange 3 throughout its length. The bottom flanges 4 of the two side frames support the ends of a centrally disposed spring plank 5 of channel shape which in turn forms a seat for springs 6. The spring plank 5 ties the bottom flanges 4 together by means of pin 7 which passes through a hole 8 in each bottom side flange and a perforation 9 in each end portion of the spring plank. Each pin 7 has a head portion 10 and is preferably welded to the bottom flange 4 of the side frame only and has a pivotal connection with the spring plank member to give more flexibility, but the ends of the spring plank may be rigidly attached to the side frame if desired.

The lower portion of the ends of each Z-shaped side frame member is cut away as at 11 and the web 2 recessed as at 12. Each recess is adapted to receive an inverted U-shaped bearing box 13 for the axles 14. These inverted U-shaped bearing boxes have one leg 15 longer than the other and are welded to the web 2 and the bottom flange 4 of the side frame and are adapted to straddle the axles 14 and tie the ends of the side frames and axles together and transmit the load to the axles.

These bearing boxes 13 each have a bottom tie plate 16 welded to the legs so that in case of derailment the axles will not become disengaged from the side frame. Each bearing box 13 and web 2 of the side frames are further reinforced by means of vertical and longitudinally extending plates 17 and 18 respectively.

Adjacent to the center of each side frame vertically inwardly extending plate members 19 are placed on each side of the ends of the bolster 20 and spring plank 5. These vertical inwardly extending plate members 19 have a flanged top end portion 21 and are welded to the side frames and are adapted to take the side thrusts of the bolster and spring plank and help maintain the truck in alignment. The plate members 19 form column guides for the ends of the bolster and are further provided with wear plates 22 for this purpose.

A stop 23 is welded to each truck side frame under the end members 28 of the bolster 20 to prevent the springs 6 from going solid under excessive load.

A pin 24 passes through the web of each side frame member above the ends of the bolster and is welded to the side frame after application of the bolster. When the car is lifted from the track, this pin prevents the frames with the wheels and axles from becoming disengaged from the car.

The bolster 20 comprises a pressed U-shaped member having a top web portion 25 with downwardly extending legs 26 which are connected together near their lower edges by means of a bottom horizontal plate member 27 and at the ends by means of plates 28. A center plate 29 for swiveling and inverted U-shaped side bearings 30 for maintaining the car (not shown) in a level position is welded to the top of the bolster. The bottom horizontal plate member 27 is shortened so the springs 6 can be placed between the vertical legs 26 of the bolster and support the bolster by contacting the under side of the top web portion 25 at the ends of the bolster. The bolster is further stiffened by vertical plate members 31 under the center plate 29 and the legs 26 of the bolster are slotted centrally as at 32 for the application of a key 33 which extends through a slot 34 in the king bolt 35 which is adapted to tie the car and truck together.

The springs 6 are held and centered in place by the pins 7 which pass through the bottom horizontal flange 4 of the side frames and the spring plank 5.

Figure 2:
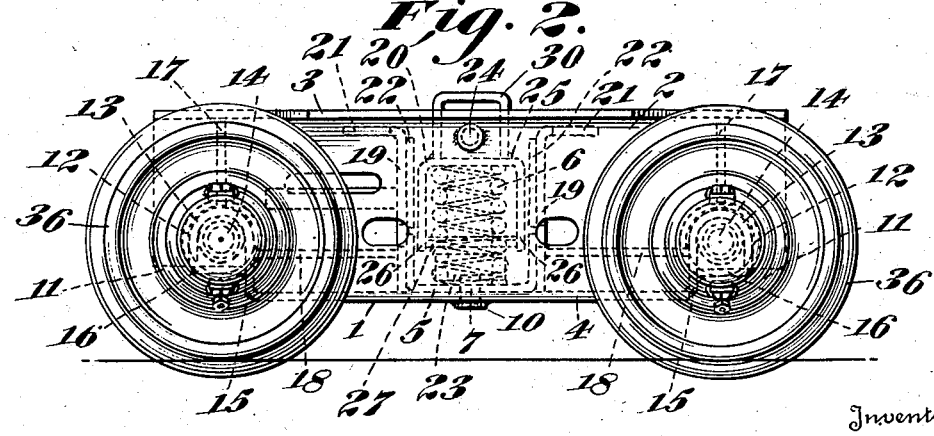
Fig. 2 is a side elevation of the truck shown in Fig. 1.

In the truck shown in Figs. 1, 2 and 3 the axles 14 are journalled for rotation in the bearing boxes 13 and are adapted to have a slight vertical and longitudinal movement in relation to the side frames while the wheels 36 are mounted for rotation on roller bearings independently of the axles.

In Figs. 5 and 6 the axle 37 in the bearing 13 has its sides flattened as at 38 to hold the axle against rotation in relation to the side frame but is adapted to have a slight vertical and longitudinal movement in the bearings and the wheels are mounted for independent rotation in a similar manner as illustrated in Fig. 3.

It will be noted that the axles for the trucks shown in Figs. 1, 2, 3, 5 and 6 are not rigidly secured to the truck frames but are adapted for vertical or rotary movement in relation thereto which will permit the desired flexibility required for uneven tracks.

In Fig. 7 we have shown a slight modification in which the ends of the bolster are offset as at 39 and the spring plank 5 is also offset as at 40. In this construction substantially the same space for the spring 6 and the height of the car is maintained while the central portion of the bolster structure is considerably narrower to give clearance for a car haul which is used in some mines. In this modification shown in Fig. 7, instead of using a pin extending through the web 2 of the side frame member above the ends of the bolster a bent L-shaped plate 41 is used; otherwise the construction is the same in Figs. 5, 6 and 7 as described in Figs. 1 to 4 inclusive and the same reference numerals will apply thereto.

Although we have shown and described our invention in considerable detail, we do not wish to be limited to the exact and specific details shown and described, but may use such substitutions, modifications or equivalents thereof, as are embraced within the scope of our invention or as are pointed out in the claims.

Having thus described our invention what we claim as new and desire to secure by Letters Patent is:

1. A four wheel car truck having a longitudinally extending side frame member of Z-shape at each side of the truck having their flanges parallel to each other throughout their length, front and rear axles movably mounted and adapted to form the end frame members of the truck connecting the ends of said Z-shaped side frames with the ends of said axles extending beyond the outer side of the Z-shaped side frames, supporting wheels independently rotatable on the extending ends of said axles, and roller bearings interposed between said wheels and axles.

2. A four wheel car truck having a longitudinally extending side frame member of Z-shape at each side of the truck each disposed with its web vertically and the top and bottom flange parallel with each other throughout their length, front and rear axles rotatably mounted and adapted to form the end frame members of the truck connecting the ends of said Z-shaped side frames together, independently rotatable supporting wheels mounted on said axles adjacent to the outer sides of said Z-shaped side frames, and roller bearings interposed between said wheels and axles.

3. A four wheel car truck having a side frame at each side of the truck of Z-shape disposed with their webs vertical and the top and bottom flanges horizontally in parallel relation throughout their lengths, a spring plank attached to the bottom flanges for connecting the central portions of the Z-shaped side frames together, an axle bearing box secured to each end of the Z-shaped side frame, and axles movably mounted in the axle bearing boxes adapted to form the end frame members of the truck for connecting the ends of the Z-shaped side frames.

4. A four wheel car truck having a longitudinal side frame member of Z-shape at each side of the truck having flanges parallel to each other throughout its length, a spring plank connecting the central portions of the side frame members, an axle bearing box secured to each end of the Z-shaped side frame, front and rear axles having their end portions extending beyond the outer sides of the Z-shaped side frames slidably mounted in the axle bearing boxes for connecting the ends of the Z-shaped side frames together and adapted to form the end frame members of the truck, supporting wheels independently rotatable on the extending end portions of said axles, and roller bearings interposed between said wheels and axles.

5. A four wheel car truck having a longitudinally extending Z-shaped side frame member of substantially uniform depth with their flanges parallel to each other throughout its length at each side of the truck disposed with their webs vertically and their lower flanges extending inwardly, a spring plank pivotally attached to the central portion of the lower flanges for connecting the side frames together, an axle bearing box secured to each end of the Z-shaped side frames, and front and rear axles movably mounted in the axle bearing boxes for connecting the ends of the Z-shaped side frames together and adapted to form the end frame members of the truck.

6. A four wheel car truck having a pressed longitudinally extending Z-shaped side frame at each side of the truck disposed with their webs vertically and their lower flanges extending inwardly and parallel with the top flanges throughout their length, a spring plank attached to the central portion of the lower flanges for connecting the side frames together, springs mounted on each end of the spring plank, a bolster mounted above the spring plank adapted to be resiliently supported by the springs, vertically inwardly extending plates at opposite sides of each end of the bolster secured to each of the Z-shaped side frames, an axle bearing box secured to each end of the Z-shaped side frames, front and rear axles movably mounted in the axle bearing boxes for connecting the ends of the Z-shaped side frames together and adapted to form the end frame members of the truck frame, supporting wheels independently rotatable on said axles, and roller bearings interposed between said wheels and axles.

7. A four wheel car truck having a pressed longitudinally extending Z-shaped side frame at each side of the truck, disposed with their webs vertically and their lower flanges extending inwardly and parallel with the top flanges throughout their length, a spring plank between the side frames having its ends pivoted to the lower flanges for connecting the side frames together, springs mounted on each end of the spring plank, a bolster mounted above the spring plank between the side frames adapted to be resiliently supported by the springs, vertically inwardly extending plates at opposite sides of each end of the bolster secured to the Z-shaped side frames adapted to form column guides for the said bolster, a recess formed in each end portion of the Z-shaped side frames, an axle bearing box secured in each recess, front and rear axles slidably secured in the axle bearing boxes for connecting the ends of the Z-shaped side frames, supporting wheels independently rotatable on said axles, and roller bearings interposed between said wheels and axles.

8. A four wheel car truck having a side frame at each side of the truck of Z-shape, each Z-shaped side frame constructed of a plate of pressed metal disposed with its web vertically with the top flange extending outwardly and its bottom flange extending inwardly and parallel with the top flange throughout its length, vertical and longitudinally inwardly extending reinforcing plates secured to the web of each Z-shaped side frame, a spring plank between the side frame members having its ends secured to the central portion of the bottom flanges for connecting the Z-shaped side frames together, and a front and rear axle slidably mounted for connecting the ends of the Z-shaped side frames together adapted to form the end frame members.

9. A four wheel car truck having a longitudinally extending side frame at each side of the truck of Z-shape, each Z-shaped side frame constructed of a plate of pressed metal disposed with its web vertically, a top flange extending outwardly therefrom and the bottom flange extending inwardly in parallel relation to the top flange throughout its length, a spring plank having its ends pivotally secured centrally to the bottom flanges for connecting the Z-shaped side frames together, a bolster resiliently mounted on the spring plank, vertical inwardly extending column guide plates secured to the Z-shaped side frame at opposite sides of the ends of the bolster, an axle box secured to each end of the Z-shaped side frames, front and rear axles mounted for rotation in the axle boxes for connecting the ends of the Z-shaped side frames together, supporting wheels independently rotatable on the axles, and roller bearings interposed between said wheels and axles.

10. A four wheel car truck having a longitudinally extending side frame at each side of Z-shape, each Z-shaped side frame constructed of a plate of pressed metal disposed with its web vertically and its lower flange extending inwardly in parallel relation throughout its length with the top flange, a spring plank pivoted to the lower flanges for connecting the central portions of the Z-shaped side frames together, front and rear axles rotatably supported at an intermediate point for connecting the ends of the truck frames together, wheels independently rotatable on the ends of said axles adjacent to the outer side of the Z-shaped side frames, and roller bearings interposed between said wheels and axles.

11. A four wheel car truck having a longitudinally extending side frame member of Z-shape at each side of the truck, each Z-shaped side frame member disposed with its web vertically and the top and bottom flanges horizontally in parallel uniform spaced relation to each other throughout their length, a bearing box secured to the web and bottom flange at each end of the Z-shaped side frame members, a spring plank connecting the central portions of the Z-shaped side frame members, front and rear axles rotatably mounted in the bearing boxes for connecting the ends of said Z-shaped side frame members and adapted to form the end frame members, supporting wheels independently rotatable on said axles, and roller bearings interposed between said wheels and axles.

12. A four wheel car truck having a longitudinally extending side frame member of Z-shape at each side of the truck, each Z-shaped side frame member disposed with its web vertically and the top and bottom flanges horizontally in uniform spaced relation to each other throughout their length with the bottom flange extending inwardly, a cut away lower portion at each end of the Z-shaped side frame members, a recess formed in the web adjacent to each cut away portion, an inverted U-shaped bearing box in each recess and welded to the web and the end of the bottom flange, a spring plank having its ends pivotally attached to the central portion of the bottom flanges for connecting the Z-shaped side frame members, front and rear axles mounted in the bearing boxes for connecting the ends of said Z-shaped side frame members, supporting wheels independently rotatable on said axles, and roller bearings interposed between said wheels and axles.

13. A four wheel car truck having a longitudinally extending side frame member of Z-shape at each side of the truck, each Z-shaped side frame member disposed with its web vertically and the top and bottom flanges horizontally in uniform spaced relation to each other throughout their length with the bottom flange extending inwardly, a spring plank having its ends pivotally attached to the central portion of the lower flanges for connecting the Z-shaped side frame members together, springs seated on each end of the spring plank above the bottom flanges, a bolster mounted above the spring plank resiliently supported by the springs, vertical inwardly extending column guide plates at each side of the ends of the bolster and spring plank secured to the webs and bottom flanges of the Z-shaped side frame members, inverted U-shaped bearing boxes extending through the web and welded thereto at each end of the Z-shaped side frames, and front and rear axles mounted in the bearing boxes for connecting the ends of said Z-shaped side frame members together.

14. A four wheel car truck having a longitudinally extending side frame member of Z-shape at each side of the truck, each Z-shaped side frame member disposed with its web vertically and the top and bottom flanges horizontally in uniform spaced relation to each other throughout their length with the bottom flange extending inwardly, a spring plank between the webs having its ends pivotally attached to the central portion of the lower flanges for connecting the Z-shaped side frame members together, springs seated on each end of the spring plank above the bottom flanges, a bolster mounted above the spring plank resiliently supported by the springs, vertical inwardly extending column guide plates at each side of the ends of the bolster and spring plank secured to the webs and bottom flanges of the Z-shaped side frame members, inverted U-shaped bearing boxes extending through the web and welded thereto at each end of the Z-shaped side frames, vertical and longitudinal reinforcing plates welded to the bearing boxes and the webs of the Z-shaped side frames, front and rear axles mounted in the bearing boxes for connecting the ends of said Z-shaped side frame members together, and wheels located outside of said side frame members independently rotatable on said axles.

15. A four wheel car truck having a longitudinally extending side frame member of Z-shape at each side of the truck, each side frame member disposed with its web vertically and the top and bottom flanges horizontally in uniform spaced relation to each other throughout their length with the bottom flange extending inwardly, a spring plank of channel shape disposed with its flanges extending vertically between the webs of the side frame members having its ends pivotally attached to the central portion of the lower flanges for connecting the Z-shaped side frame members together, springs seated on each end of the spring plank above the bottom flanges, a bolster between the side frame members mounted above the spring plank resiliently supported by the springs and disposed with the lower edges in sliding relation between the flanges of the spring plank, means for limiting the vertical movement of the bolster, vertical inwardly extending column guide plates having flanged upper ends at each side of the ends of the bolster and spring plank secured to the webs and bottom flanges of the Z-shaped side frame members, inverted U-shaped bearing boxes extending through the web and welded to each end of the Z-shaped side frame members, front and rear axles rotatably mounted in the U-shaped bearing boxes for connecting the ends of the said Z-shaped side frame members together, and wheels located outside of said side frame members independently rotatable on said axles.

16. A four wheel car truck having a longitudinally extending side frame member of Z-shape at each side of the truck, each Z-shaped side frame member disposed with its web vertically and the top and bottom flanges horizontally in uniform spaced relation to each other throughout their length with the bottom flange extending inwardly, a spring plank of channel shape disposed with its flanges vertically between the webs having its ends pivotally attached to the central portion of the lower flanges for connecting the side frame members together, springs seated on each end of the spring plank above the bottom flanges, a bolster mounted between the side frames above the spring plank resiliently supported by the springs and disposed with its lower edges in sliding relation between the flanges of the spring plank, means for limiting the vertical movement of the bolster, vertical inwardly extending column guide plates having flanged upper ends at each side of the ends of the bolster and spring plank welded to the webs and bottom flanges of the side frame members, said vertical inwardly extending column guide plates being spaced apart at their top ends for the inserting or removal of the bolster, a pin extending through each web of the side frame members above the ends of the bolster to normally prevent the removal of the bolster, inverted U-shaped bearing boxes extending through the web and welded thereto at each end of the side frame members, a tie plate connecting the end portions of the legs of each bearing box, vertical and longitudinally extending reinforcing plates welded to the bearing boxes and the webs of the side frames, front and rear axles rotatably mounted in the bearing boxes for connecting the ends of said side frame members together, and wheels located outside of said side frame members independently rotatable on said axles, and roller bearings interposed between said wheels and axles.

WALTER H. STATLER.
LOUIS G. MILLER.